US009938876B2

(12) United States Patent
Shirasawa et al.

(10) Patent No.: US 9,938,876 B2
(45) Date of Patent: Apr. 10, 2018

(54) ABNORMALITY DIAGNOSIS DEVICE FOR EXHAUST GAS PURIFICATION APPARATUS IN INTERNAL COMBUSTION ENGINE

(71) Applicant: TOYOTA JIDOSHA KABUSHIKI KAISHA, Toyota-shi, Aichi-ken (JP)

(72) Inventors: Takeru Shirasawa, Susono (JP); Toru Kidokoro, Hadano (JP); Makoto Ogiso, Mishima (JP); Kenji Furui, Sunto-gun (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/434,621

(22) Filed: Feb. 16, 2017

(65) Prior Publication Data

US 2017/0241315 A1 Aug. 24, 2017

(30) Foreign Application Priority Data

Feb. 19, 2016 (JP) .................................. 2016-030144
Nov. 17, 2016 (JP) .................................. 2016-224211

(51) Int. Cl.
*F01N 3/20* (2006.01)
*B01D 53/94* (2006.01)
*F01N 11/00* (2006.01)

(52) U.S. Cl.
CPC ......... *F01N 3/208* (2013.01); *B01D 53/9418* (2013.01); *B01D 53/9495* (2013.01); *F01N 11/002* (2013.01); *F01N 2610/02* (2013.01); *F01N 2610/148* (2013.01);

(Continued)

(58) Field of Classification Search
None
See application file for complete search history.

(56) References Cited

U.S. PATENT DOCUMENTS 6,470,673 B1 * 10/2002 van Nieuwstadt ..... B01D 53/90
60/274
2010/0005871 A1 1/2010 Kitazawa
(Continued)

FOREIGN PATENT DOCUMENTS

| JP | 2008-180193 | 8/2008 |
| JP | 2008-202469 | 9/2008 |
| JP | 2011-117440 | 6/2011 |

*Primary Examiner* — Walter D. Griffin
*Assistant Examiner* — Jelitza M Perez
(74) *Attorney, Agent, or Firm* — Finnegan, Henderson, Farabow, Garrett & Dunner, LLP

(57) ABSTRACT

When an integrated value of a determination value correlated with a command value for an amount of supply of a reducing agent at the time of the command value being larger than a command supply amount threshold value reaches an integration threshold value, a determination is made that a diagnosis condition is satisfied, and an abnormality in the supply of the reducing agent is diagnosed based on an integrated value of the command value for the amount of supply of the reducing agent and an integrated value of an estimated value of the amount of supply of the reducing agent, whereas in cases where a period of time in which the diagnosis condition is not satisfied is longer than a time period threshold value, an interval of supply of the reducing agent is extended.

2 Claims, 11 Drawing Sheets

(52) U.S. Cl.
CPC .. *F01N 2610/1433* (2013.01); *F01N 2900/16* (2013.01); *F01N 2900/1602* (2013.01)

(56) References Cited

U.S. PATENT DOCUMENTS

2010/0071349 A1   3/2010   Kitazawa
2011/0099983 A1   5/2011   Ohno

* cited by examiner

[Fig. 1]
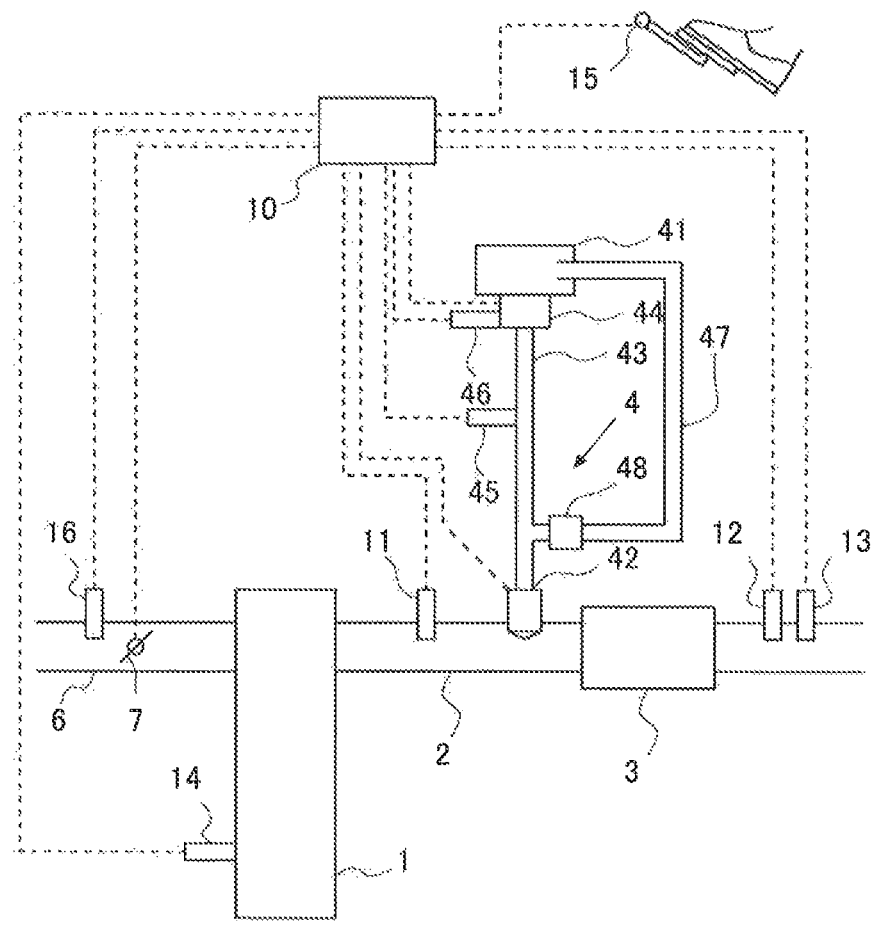

[Fig. 2]
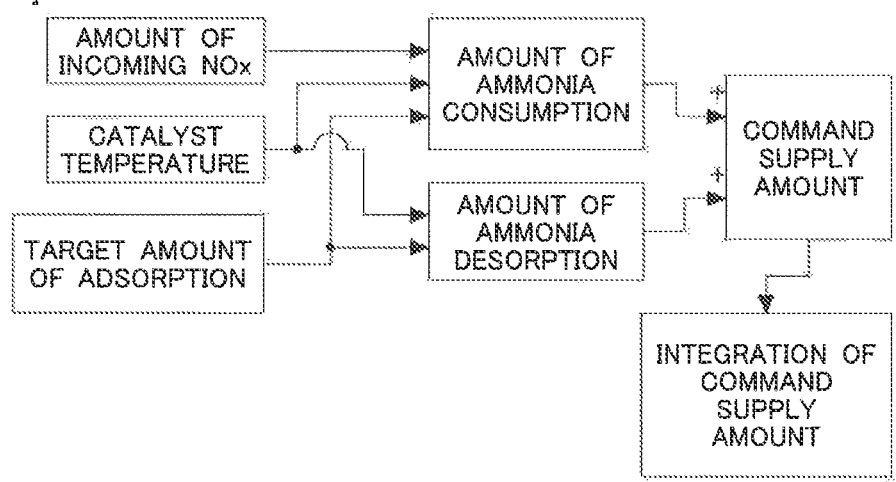

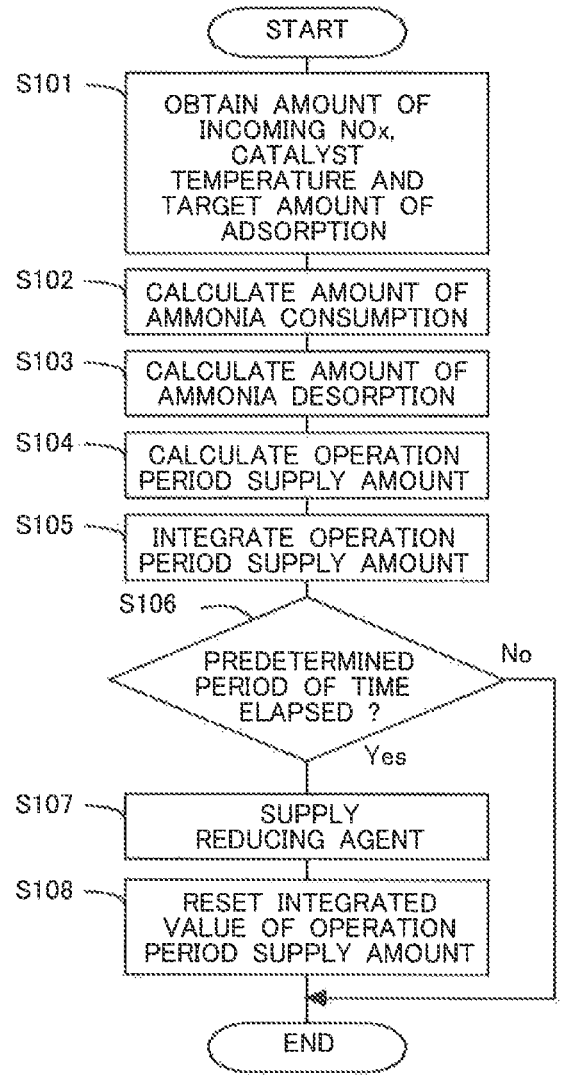

[Fig. 4]
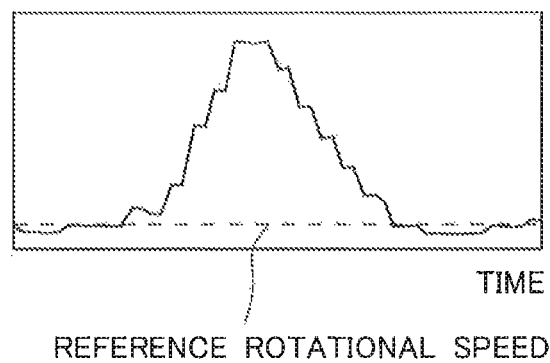

[Fig. 5]
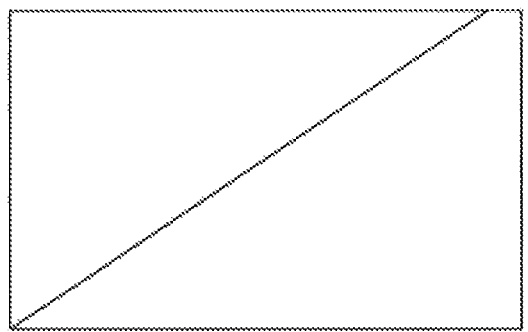

[Fig. 6]
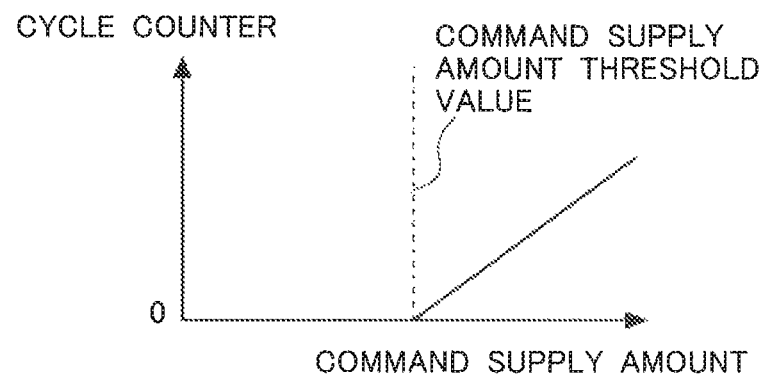

[Fig. 7]
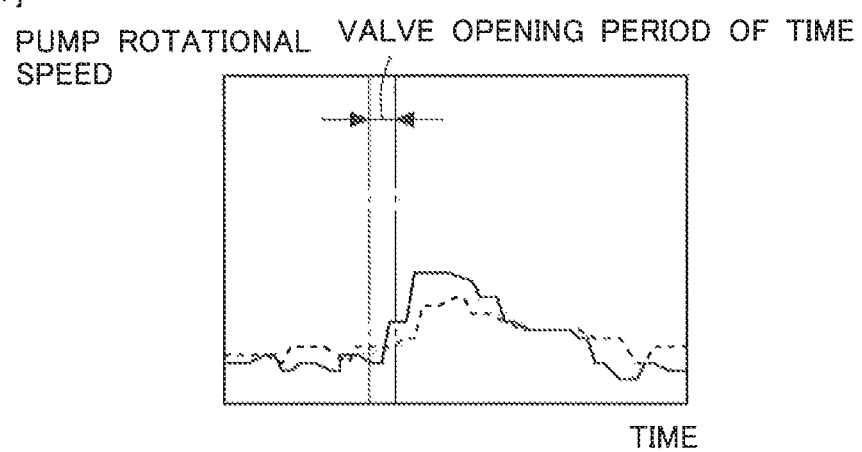

[Fig. 8]
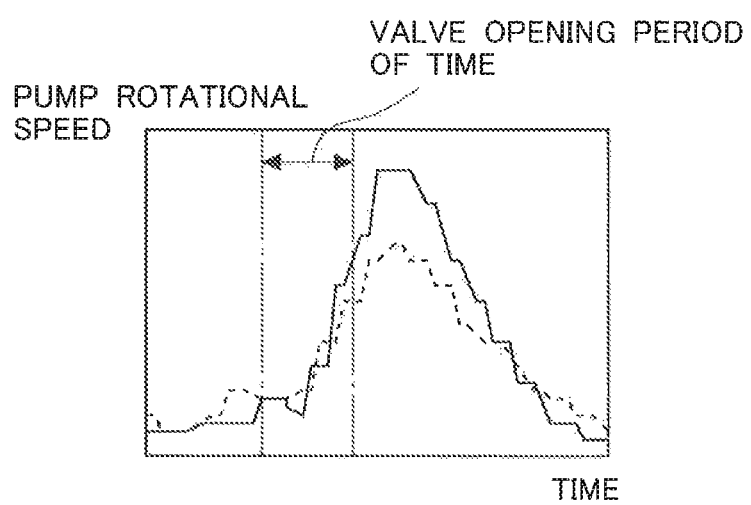

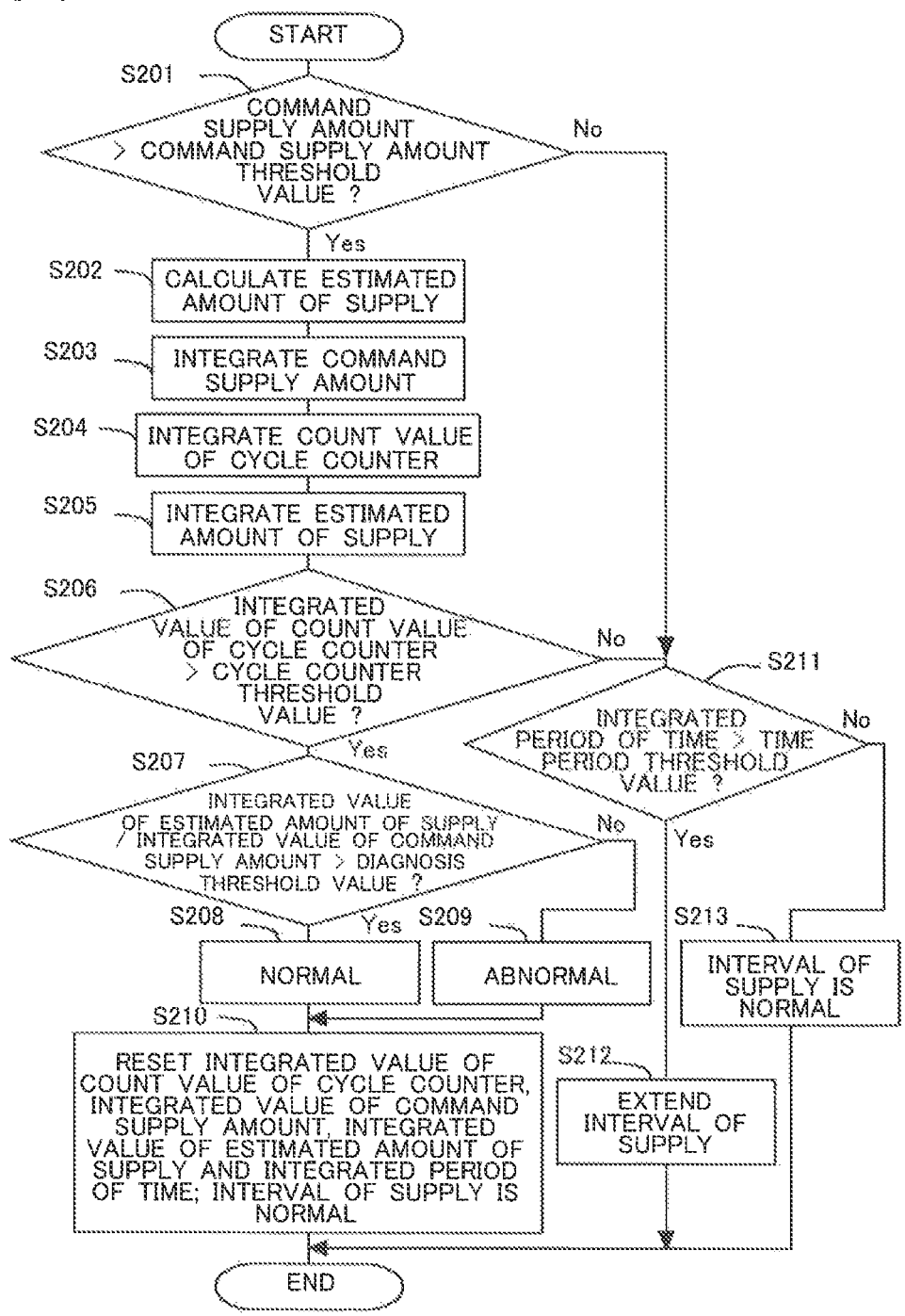

[Fig. 10]
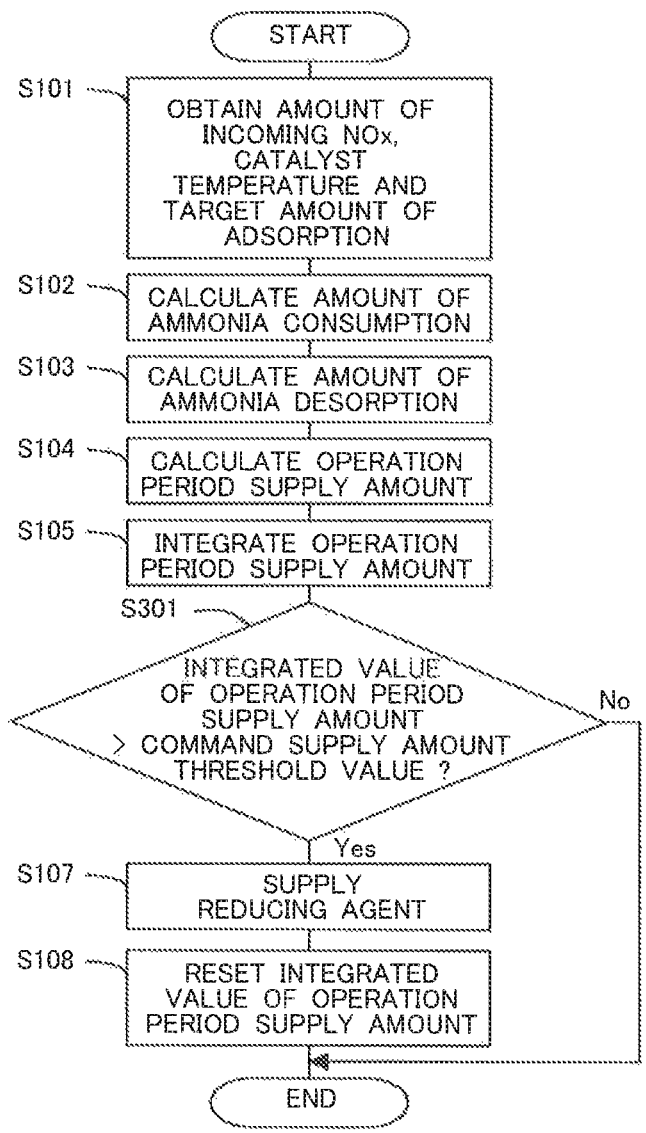

[Fig. 11]
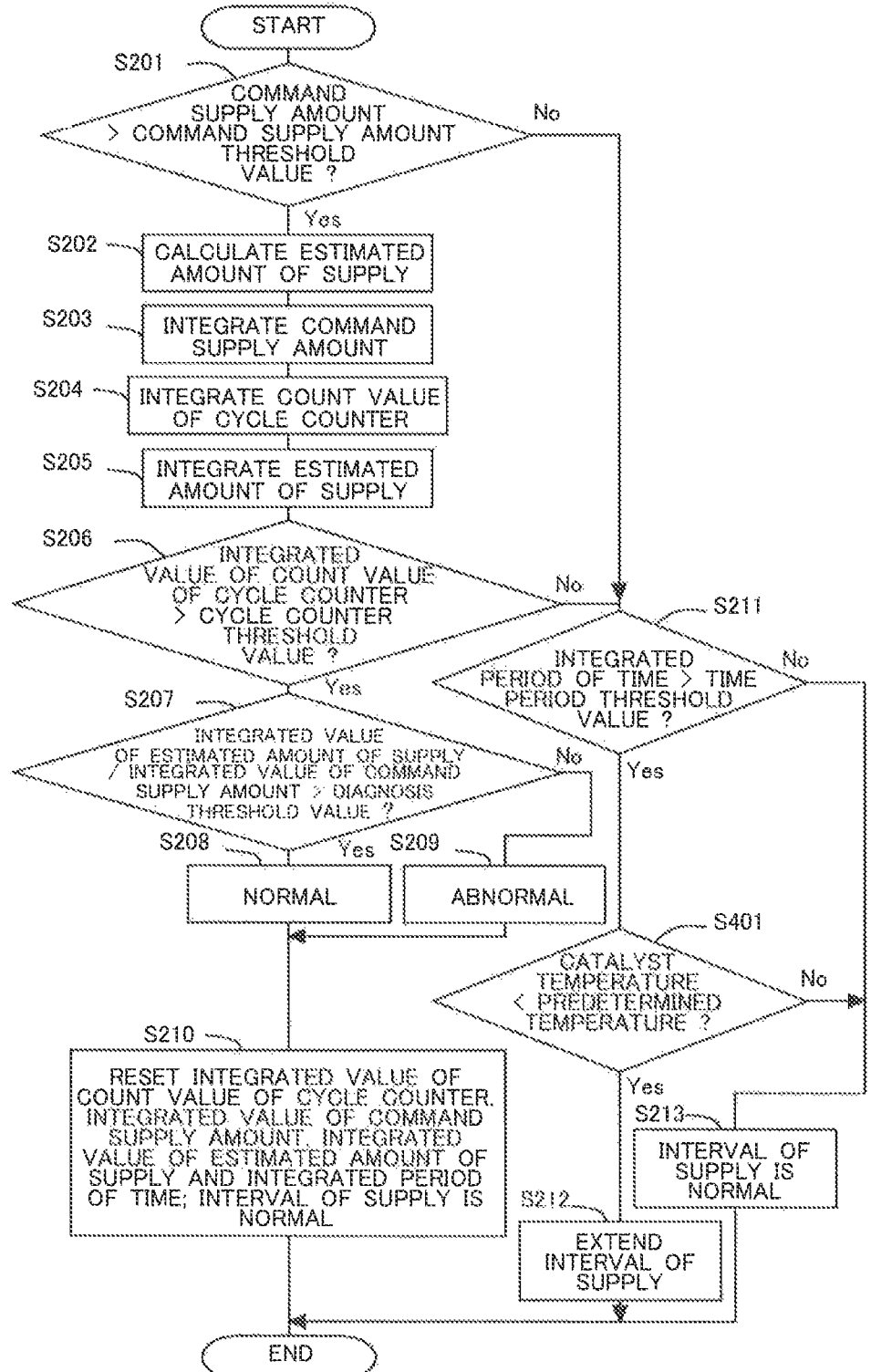

ABNORMALITY DIAGNOSIS DEVICE FOR EXHAUST GAS PURIFICATION APPARATUS IN INTERNAL COMBUSTION ENGINE

CROSS REFERENCE TO RELATED APPLICATIONS

This application claims priority to Japanese Patent Application No. 2016-030144 filed on Feb. 19, 2016, and Japanese Patent Application No. 2016-224211 filed on Nov. 17, 2016 the entire contents of which are incorporated by reference herein.

BACKGROUND OF THE DISCLOSURE

Field of the Disclosure

The present disclosure relates to an abnormality diagnosis device for an exhaust gas purification apparatus in an internal combustion engine.

Background

There has been known an NOx selective catalytic reduction catalyst (hereinafter, also referred to simply as an "NOx catalyst") which purifies (removes or reduces) NOx contained in an exhaust gas from an internal combustion engine by using ammonia as a reducing agent. At the upstream side of this NOx catalyst, there is arranged an addition valve or the like which serves to add ammonia or a precursor of ammonia into the exhaust gas. As the precursor of ammonia, there can be mentioned urea, for example. Hereinafter, the precursor of ammonia or ammonia is also collectively referred to as "a reducing agent".

Here, there has been known a technology in which a determination of whether clogging has occurred in an addition valve is made by using the value of pressure in a reducing agent passage at the time of returning a reducing agent to a tank (for example, refer to patent literature 1). In addition, in the patent literature 1, it is also further described that the determination of whether clogging has occurred in the addition valve is made based on an amount of pressure drop in the reducing agent passage at the time when the reducing agent was supplied.

CITATION LIST

Patent Literature

Patent Literature 1: Japanese patent laid-open publication No. 2011-117440
Patent Literature 2: Japanese patent laid-open publication No. 2008-202469
Patent Literature 3: Japanese patent laid-open publication No. 2008-180193

SUMMARY

Technical Problem

In cases where the determination of whether clogging has occurred in the addition valve is made by using the value of pressure in the reducing agent passage at the time of returning the reducing agent to the tank, the reducing agent can not be supplied from the addition valve, and hence, there is a fear that the rate of NOx reduction (NOx reduction rate) may drop due to shortage of the reducing agent during the operation of the internal combustion engine. On the other hand, in cases where the determination of whether clogging has occurred in the addition valve is made based on the amount of pressure drop at the time of the supply of the reducing agent, the amount of pressure drop is small when the amount of supply of the reducing agent is small, so there is a fear that the accuracy of the determination may decrease. In these cases, when an abnormality diagnosis of a reducing agent supply device is not carried out, an opportunity to carry out the abnormality diagnosis will be reduced.

Accordingly, the present disclosure has for its object to increase an opportunity to diagnose an abnormality in the supply of a reducing agent.

Solution to Problem

In order to achieve the above-mentioned object, the present disclosure resides in an abnormality diagnosis device for an exhaust gas purification apparatus in an internal combustion engine, which is to diagnose an abnormality of said exhaust gas purification apparatus which is provided with: an NOx selective catalytic reduction catalyst that is arranged in an exhaust passage of the internal combustion engine and configured to reduce NOx by using a reducing agent; an addition valve configured to supply the reducing agent into said exhaust passage at the upstream side of said NOx selective catalytic reduction catalyst; a pump configured to deliver an amount of reducing agent to said addition valve according to a rotational speed thereof; a reducing agent passage that connects said pump and said addition valve with each other for flowing the reducing agent therethrough; and a pressure sensor configured to detect a pressure of the reducing agent; said abnormality diagnosis device comprising: a controller configured to: calculate a command value for an amount of supply of the reducing agent to be given to said addition valve at each interval of supply of the reducing agent, based on a total amount of an amount of NOx which flows into said NOx selective catalytic reduction catalyst at each interval of supply of the reducing agent; calculate an estimated value of the amount of supply of the reducing agent from said addition valve at each interval of supply of said reducing agent based on the pressure detected by said pressure sensor or a physical quantity correlated with said pressure; and make a determination that a diagnosis condition, which is a condition for diagnosing an abnormality in the supply of the reducing agent, is satisfied, when an integrated value of a determination value correlated with the command value of the amount of supply of the reducing agent calculated by said controller at the time when said command value is larger than a command supply amount threshold value reaches an integration threshold value, and diagnoses an abnormality in the supply of the reducing agent, based on an integrated value of the command value of the amount of supply of the reducing agent calculated by said controller at the time when said command value is larger than said command supply amount threshold value, and an integrated value of the estimated value of the amount of supply of the reducing agent calculated by said controller, at the same time as when the command value of the amount of supply of the reducing agent calculated by said controller is larger than said command supply amount threshold value, wherein said controller configured to extend the interval of supply of said reducing agent in the case where a period of time in which said diagnosis condition is not satisfied is longer than a time period threshold value, more than in the case where said diagnosis condition is satisfied, or in the case where the period of time in which said diagnosis condition is not satisfied is equal to or less than said time period threshold value.

The controller diagnoses that there is an abnormal, in cases where the estimated value of the amount of supply of the reducing agent estimated by the controller is largely apart from the command value of the amount of supply of the reducing agent calculated by the controller, when the diagnosis condition is satisfied. Here, note that at the time of carrying out the abnormality diagnosis, the accuracy of the abnormality diagnosis is enhanced by making a comparison between the integrated value of the command value and the integrated value of the estimated value in the same period of time, but the estimated value and the command value for the amount of supply of the reducing agent in one supply of the reducing agent can be included in these integrated values.

The diagnosis condition is set as a condition for enhancing the accuracy of the abnormality diagnosis. Here, in cases where the command value of the amount of supply of the reducing agent is small, the amount of reducing agent to be actually supplied becomes small, so the estimated value of the amount of supply of the reducing agent also becomes small. In this case, the difference in the amount of supply of the reducing agent due to the presence or absence of an abnormality becomes small. For this reason, the amount of supply of the reducing agent becomes easily affected by an error or variation of the rotational speed of the pump, and hence, the estimated value of the amount of supply of the reducing agent calculated by the controller becomes unable to reflect the actual amount of supply of the reducing agent in an accurate manner. Accordingly, when an abnormality diagnosis is carried out using the command value and the estimated value of the amount of supply of the reducing agent at this time, there is a fear that the accuracy of the abnormality diagnosis may be reduced. For this reason, the accuracy of the abnormality diagnosis is enhanced by making a comparison between the integrated value of the command value and the integrated value of the estimated value of the amount of supply of the reducing agent at the time when the command value of the amount of supply of the reducing agent is larger than the command supply amount threshold value. Accordingly, the command supply amount threshold value is a command value for the amount of supply of the reducing agent at the time of the supply of the reducing agent in the case where the accuracy of the abnormality diagnosis falls within a suitable limit.

In addition, the larger the integrated value of the command value of the amount of supply of the reducing agent at the time when the command value of the amount of supply of the reducing agent is larger than the command supply amount threshold value, the larger the difference between the integrated value of the command value and the integrated value of the estimated value of the amount of supply of the reducing agent becomes in an abnormal case and in a normal case, as a result of which it is possible to enhance the accuracy of the abnormality diagnosis. Accordingly, the determination value is set as a value correlated with the command value of the amount of supply of the reducing agent at the time when the command value of the amount of supply of the reducing agent is larger than the command supply amount threshold value. That is, what is used for the abnormality diagnosis is not a value obtained by merely integrating the command value of the amount of supply of the reducing agent, but the integrated value of the command value of the amount of supply of the reducing agent at the time when the command value of the amount of supply of the reducing agent is larger than the command supply amount threshold value, and hence, a determination is carried out using a determination value correlated with the command value of the amount of supply of the reducing agent at the time when the command value of the amount of supply of the reducing agent is larger than the command supply amount threshold value. Then, when the integrated value of the determination value reaches the integration threshold value, the accuracy of the abnormality diagnosis is assumed to be high, so a determination is made that the diagnosis condition has been satisfied. Here, note that the larger the command value, the larger the determination value may be made. The integration threshold value is decided in such a manner that the accuracy of the abnormality diagnosis falls within a suitable range.

The accuracy in the abnormality diagnosis can be enhanced by carrying out the abnormality diagnosis in the case where the diagnosis condition is satisfied, as described above. However, the period of time in which the diagnosis condition is not satisfied becomes long, depending on the operating state of the internal combustion engine. Accordingly, when the period of time in which the diagnosis condition is not satisfied becomes equal to or more than the time period threshold value, the controller extends the interval of supply of the reducing agent. The longer the interval of supply of the reducing agent, the more becomes the total amount of the amount of NOx flowing into the NOx selective catalytic reduction catalyst by the time the reducing agent is supplied, so that the command value for the amount of supply of the reducing agent per one time becomes larger. That is, the longer the interval of supply of the reducing agent, the larger becomes the command value of the amount of supply of the reducing agent. Thus, the amount of reducing agent to be supplied at the time of the next supply of the reducing agent is increased by extending the interval of supply of the reducing agent. That is, the command value of the amount of supply of the reducing agent can be made to increase. In this manner, too, the reducing agent can be supplied according to the amount of NOx in the exhaust gas, so that the decrease of the NOx removal or reduction rate can be suppressed. Then, due to the increase in the amount of supply of the reducing agent per one time, the command value of the amount of supply of the reducing agent becomes easy to exceed the command supply amount threshold value, so that the diagnosis condition can be easily satisfied, thus making it possible to start the abnormality diagnosis more quickly. Accordingly, the opportunity for the abnormality diagnosis can be increased. Here, note that the time period threshold value is set so as to satisfy the frequency of the abnormality diagnosis as required.

Moreover, in cases where the period of time in which said diagnosis condition is not satisfied is longer than said time period threshold value, said controller may extend the interval of supply of said reducing agent in the case where the temperature of said NOx selective catalytic reduction catalyst is less than a predetermined temperature, more than in the case where said diagnosis condition is satisfied, or in the case where the period of time in which said diagnosis condition is not satisfied is equal to or less than said time period threshold value, whereas said controller may make the interval of supply of said reducing agent in the case where the temperature of said NOx selective catalytic reduction catalyst is equal to or higher than said predetermined temperature, equal to that in the case where said diagnosis condition is satisfied, or in the case where the period of time in which said diagnosis condition is not satisfied is equal to or less than said time period threshold value.

When the temperature of the NOx catalyst becomes too high, an adsorbable amount of the reducing agent will become small, and hence, if the frequency of supply of the reducing agent is not enhanced, there will be a fear that the reducing agent for reducing NOx may run short. At this time, if the interval of supply of the reducing agent is extended, the reducing agent may run short, and the NOx reduction rate may decrease or become low. In contrast to this, if the interval of supply of the reducing agent is not extended in the case where the temperature of the NOx catalyst is equal to or higher than the predetermined temperature, the reducing agent can be suppressed from running short in the NOx catalyst, thus making it possible to suppress the NOx reduction rate from decreasing. That is, in the case where the temperature of the NOx catalyst is equal to or higher than the predetermined temperature, priority is given to suppressing the decrease of the exhaust gas purification performance over carrying out abnormality diagnosis. The predetermined temperature is a temperature at which the NOx reduction rate becomes lower than an allowable range when the interval of supply of the reducing agent is extended.

Advantageous Effects

According to the present disclosure, it is possible to increase an opportunity to diagnose an abnormality in the supply of a reducing agent.

Further features of the present disclosure will become apparent from the following description of exemplary embodiments with reference to the attached drawings.

BRIEF DESCRIPTION OF DRAWINGS

FIG. 1 is a view showing the schematic construction of an internal combustion engine as well as its intake and exhaust systems according to embodiments of the present disclosure.

FIG. 2 is a block diagram for obtaining a command supply amount.

FIG. 3 is a flow chart showing a flow for reducing agent supply control.

FIG. 4 is a time chart showing the change over time of the rotational speed of a pump when the reducing agent is supplied from an addition valve.

FIG. 5 is a view showing the relation between a rotational speed counter and an estimated amount of supply.

FIG. 6 is a view showing the relation between the command supply amount and a cycle counter at the time of supplying the reducing agent.

FIG. 7 is a time chart showing the change over time of the rotational speed of the pump in cases where the command supply amount is relatively small.

FIG. 8 is a time chart showing the change over time of the rotational speed of the pump in cases where the command supply amount is relatively large.

FIG. 9 is a flow chart showing a flow for abnormality diagnosis of a reducing agent supply device according to a first embodiment.

FIG. 10 is a flow chart showing a flow for reducing agent supply control in cases where an interval of supply of the reducing agent is extended.

FIG. 11 is a flow chart showing a flow for abnormality diagnosis of a reducing agent supply device according to a second embodiment.

DESCRIPTION OF EMBODIMENTS

Hereinafter, the best modes for carrying out the present disclosure will be exemplarily described in detail based on preferred embodiments with reference to the attached drawings. However, the dimensions, materials, shapes, relative arrangements and so on of component parts described in the embodiments are not intended to limit the scope of the present disclosure to these alone in particular as long as there are no specific statements.

First Embodiment

FIG. 1 is a view showing the schematic construction of an internal combustion engine as well as its intake and exhaust systems according to a first embodiment of the present disclosure. The internal combustion engine denoted by 1 is a diesel engine for driving a vehicle. However, the internal combustion engine 1 may be a gasoline engine. An exhaust passage 2 is connected to the internal combustion engine 1. In the exhaust passage 2, there is arranged an NOx selective catalytic reduction catalyst 3 (hereinafter referred to as an NOx catalyst 3) which serves to selectively reduce NOx in an exhaust gas with the use of ammonia as a reducing agent.

A reducing agent supply device 4 for supplying the reducing agent to the NOx catalyst 3 is mounted on the exhaust passage 2 at the upstream side of the NOx catalyst 3. The reducing agent supply device 4 is provided with a tank 41, an addition valve 42, a reducing agent passage 43, a pump 44, a pressure sensor 45, a return passage 47, and a check valve 48.

The tank 41 stores urea water. The addition valve 42 is mounted on the exhaust passage 2 at a location upstream of the NOx catalyst 3, and serves to inject the urea water. The reducing agent passage 43 connects the tank 41 and the addition valve 42 with each other, and circulates the urea water therebetween. The urea water supplied from the addition valve 42 is hydrolyzed into ammonia by the heat of the exhaust gas or the heat from the NOx catalyst 3, and the ammonia thus generated is adsorbed to the NOx catalyst 3. This ammonia is used as the reducing agent in the NOx catalyst 3. Here, note that in the following, the ammonia and the urea water are collectively referred to as the reducing agent.

The pump 44 is arranged at a location where the reducing agent passage 43 is connected to the tank 41, and the pump 44 serves to deliver the reducing agent. Here, note that the pump 44 may also be arranged in the interior of the tank 41. The pump 44 is an electric pump, and is rotated by supplying electric power thereto. This pump 44 can change the amount of delivery of the reducing agent by changing the rotational speed thereof. With this, the pressure of the reducing agent can be adjusted. In addition, the pressure sensor 45 for detecting the pressure of the reducing agent is mounted on the reducing agent passage 43. A pump rotational speed sensor 46 for detecting the rotational speed (this may also be as the number of rotations per minute) of the pump 44 is mounted on the pump 44. Also, the return passage 47 connects the reducing agent passage 43 and the tank 41 with each other. The return passage 47 is a passage for returning a part of the reducing agent which exceeds a fixed pressure, among the reducing agent delivered from the pump 44, to the tank 41 through the check valve 48. The check valve 48 is arranged in the return passage 47, and when the pressure in the return passage 47 becomes the fixed pressure, the check valve 48 is opened to circulate the reducing agent from the side of the reducing agent passage 43 to the side of the tank 41.

Moreover, at the upstream side of the addition valve 42, there is arranged an upstream side NOx sensor 11 for detecting the concentration of NOx in the exhaust gas flowing into the NOx catalyst 3. Also, at the downstream side of the NOx catalyst 3, there are arranged a downstream side NOx sensor 12 for detecting the concentration of NOx in the exhaust gas flowing out of the NOx catalyst 3 and a temperature sensor 13 for detecting the temperature of the exhaust gas.

In addition, an intake passage 6 is connected to the internal combustion engine 1. A throttle valve 7 for regulating an amount of intake air to be supplied to the internal combustion engine 1 is arranged in the middle of the intake passage 6. Also, an air flow meter 16 for detecting the amount of intake air in the internal combustion engine 1 is mounted on the intake passage 6 at a location upstream of the throttle valve 7.

Then, an ECU 10, which is an electronic control unit, is provided in combination with the internal combustion engine 1. The ECU 10 controls the operating state of the internal combustion engine 1, an exhaust gas purification apparatus, and so on. A crank position sensor 14 and an accelerator opening sensor 15, in addition to the above-mentioned upstream side NOx sensor 11, the downstream side NOx sensor 12, the temperature sensor 13 and the air flow meter 16, the pressure sensor 45, the pump rotational speed sensor 46, are electrically connected to the ECU 10, so that the output values of these individual sensors are passed or transmitted to the ECU 10.

The ECU 10 is able to grasp the operating state of the internal combustion engine 1, such as the engine rotational speed based on the detection of the crank position sensor 14, the engine load based on the detection of the accelerator opening sensor 15, etc. Here, note that in this embodiment, the NOx in the exhaust gas flowing into the NOx catalyst 3 is able to be detected by the upstream side NOx sensor 11, but the NOx contained in the exhaust gas discharged from the internal combustion engine 1 (the exhaust gas before being purified or reduced in the NOx catalyst 3, i.e., the exhaust gas flowing into the NOx catalyst 3) has relation with the operating state of the internal combustion engine, and hence, is also able to be estimated based on the above-mentioned operating state of the internal combustion engine 1. In addition, the ECU 10 is able to estimate the temperature of the NOx catalyst 3 based on the temperature of the exhaust gas detected by the temperature sensor 13. Moreover, it is also possible to estimate the temperature of the NOx catalyst 3 based on the operating state of the internal combustion engine 1. On the other hand, the throttle valve 7, the addition valve 42 and the pump 44 are connected to the ECU 10 through electrical wiring, so that these valves and pump are controlled by means of the ECU 10.

The ECU 10 controls to supply the reducing agent from the addition valve 42 so that the amount of adsorption of ammonia in the NOx catalyst 3 becomes a target value of the amount of adsorption of ammonia in the NOx catalyst 3 (hereinafter, also referred to as a target amount of adsorption). In this case, the ECU 10 calculates an amount of reducing agent which is added from the addition valve 42 (hereinafter, also referred to as an amount of supply of the reducing agent) so as to make the amount of adsorption of ammonia of the NOx catalyst 3 equal to the target amount of adsorption, by compensating for an amount of ammonia which has been consumed in order to reduce NOx in the NOx catalyst 3 (hereinafter, also referred to as an amount of ammonia consumption) in a period of time from a starting point in time of the last supply of the reducing agent until a starting point in time of the current supply of the reducing agent (hereinafter, also referred to as an interval of supply), and an amount of ammonia which has been desorbed from the NOx catalyst 3 and decreased without reducing NOx (hereinafter, also referred to as an amount of desorption of ammonia). For this reason, the ECU 10 repeatedly calculates the amount of supply of the reducing agent based on an amount of NOx flowing into the NOx catalyst 3 (hereinafter, also referred to as an amount of incoming NOx), the temperature of the NOx catalyst 3 (hereinafter, also referred to as the catalyst temperature), and the target amount of adsorption in the NOx catalyst 3, in each of a plurality of operation periods included in the interval of supply, and integrates the amounts of supply of the reducing agent calculated during the interval of supply. Then, the integrated value of the amounts of supply of the reducing agent at the starting point in time of the supply of the reducing agent becomes a command value to be given to the addition valve 42 from the ECU 10. This command value for the amount of supply of the reducing agent is an amount of reducing agent which should actually be supplied from the addition valve 42. The amount of supply of the reducing agent, the valve opening period of time of the addition valve 42, and the pressure of the reducing agent are correlated with one another, and hence, if such a correlation has been obtained in advance by experiments, simulations, or the like, the valve opening period of time of the addition valve 42 can be decided from the amount of supply of the reducing agent to be calculated and the pressure of the reducing agent to be detected. The ECU 10 controls to supply the reducing agent, by making the addition valve 42 open for only a period of time corresponding to the amount of supply of the reducing agent. Here, note that in the following, the command value for the amount of supply of the reducing agent is also referred to as a command supply amount.

The supply of the reducing agent is carried out in each predetermined period of time. That is, the interval of supply of the reducing agent is set to a predetermined period of time. Accordingly, the amount of supply of the reducing agent integrated in the predetermined period of time from the starting time of the last supply of the reducing agent serves as a command value for the amount of supply of the reducing agent. Here, the ECU 10 carries out an abnormality diagnosis of the reducing agent supply device 4, but may extend the interval of supply of the reducing agent at the time of carrying out this abnormality diagnosis. Here, note that the predetermined period of time, which is the interval of supply of the reducing agent before extended, is set as a normal predetermined period of time. When the predetermined period of time is made too long, there is a fear that the NOx reduction rate may be decreased due to the shortage of the reducing agent in the NOx catalyst 3. On the other hand, a minimum amount in which the reducing agent can be injected with a high degree of accuracy is set for the addition valve 42. This minimum amount is decided by the performance of the addition valve 42. Accordingly, the normal predetermined period of time is decided as the interval of supply of the reducing agent at which the decrease of the NOx removal or reduction rate is suppressed, and at which the amount of supply of the reducing agent can become equal to or more than the above-mentioned minimum amount. The normal predetermined period of time is decided as an appropriate value of the interval of supply of the reducing agent, by means of experiments, simulations, or the like.

FIG. 2 is a block diagram for obtaining the command supply amount. This FIG. 2 images the functions which are achieved by means of the processing in the ECU 10. The amount of ammonia consumption can be obtained based on the amount of incoming NOx, the catalyst temperature, and the target amount of adsorption. Also, the amount of desorption of ammonia can be obtained based on the catalyst temperature and the target amount of adsorption. The amount of NOx flowing into the NOx catalyst 3 in each operation period of the ECU 10 is associated with the concentration of NOx in the exhaust gas and the flow rate of the exhaust gas, and the flow rate of the exhaust gas is associated with the amount of intake air detected by the air flow meter 16. Accordingly, the amount of NOx flowing into the NOx catalyst 3 in each operation period of the ECU 10 can be calculated based on the detected value of the upstream side NOx sensor 11 and the detected value of the air flow meter 16. Here, note that, the detected value of the upstream side NOx sensor 11 and the detected value of the air flow meter 16 are handled on the assumption that these values at the time of the current calculation continue from the time of the last calculation to the time of the current calculation, or on the assumption that these values at the time of the last calculation continue from the time of the last calculation to the time of the current calculation. Otherwise, an average value of the detected value of the upstream side NOx sensor 11 and an average value of the detected value of the air flow meter 16 from the time of the last calculation to the time of the current calculation may be obtained, respectively, and may be handled on the assumption that these average values continue from the time of the last calculation to the time of the current calculation.

Moreover, the catalyst temperature is can be detected by the temperature sensor 13. The temperature of the NOx catalyst 3 at the time of the last calculation, the temperature of the NOx catalyst 3 at the time of the current calculation, or an average value of the temperature of the NOx catalyst 3 from the time of the last calculation to the time of the current calculation can be used for the catalyst temperature used at the time of calculating the command supply amount. Further, the target value of the amount of adsorption of ammonia decided based on the operating state of the internal combustion engine 1 at the time of the current calculation or the target value of the amount of adsorption of ammonia decided based on the operating state of the internal combustion engine 1 at the time of the last calculation can be used for the target amount of adsorption. The target amount of adsorption can be obtained in advance by experiments, simulations, or the like as a value which can secure a desired NOx reduction rate in the NOx catalyst 3, and which can suppress an amount of ammonia flowing out from the NOx catalyst 3 within an allowable range. The higher the catalyst temperature, the more becomes the amount of ammonia consumption, and the more the amount of incoming NOx, the more becomes the amount of ammonia consumption, and the more the target amount of adsorption, the more becomes the amount of ammonia consumption. The higher the catalyst temperature, the more becomes the amount of ammonia desorption, and the more the target amount of adsorption, the more becomes the amount of ammonia desorption. Then, the ECU 10 calculates at each operation period thereof an amount of supply of the reducing agent (hereinafter, also referred to as an operation period supply amount), by setting, as an amount of ammonia to be supplied, a total value (amount) of the amount of ammonia consumption in the NOx catalyst 3 and the amount of desorption of ammonia in the NOx catalyst 3, and integrates this value in the period of time of the interval of supply. Then, an integrated value of the operation period supply amount at the point in time of reaching the time to supply the reducing agent serves as the command supply amount.

FIG. 3 is a flow chart showing a flow or routine for reducing agent supply control. This flow chart is carried out by means of the ECU 10 at a predetermined operation period.

In step S101, the amount of incoming NOx, the catalyst temperature, and the target amount of adsorption are acquired. As explained in FIG. 2, the amount of incoming NOx, the catalyst temperature and the target amount of adsorption are required in order to calculate the amount of supply of the reducing agent, so the values of these factors acquired as mentioned above are obtained.

In step S102, the amount of consumption of ammonia is calculated. That is, the amount of consumption of ammonia is calculated based on the amount of incoming NOx, the catalyst temperature, and the target amount of adsorption.

In step S103, the amount of desorption of ammonia is calculated. That is, the amount of desorption of ammonia is calculated based on the catalyst temperature and the target amount of adsorption.

In step S104, the operation period supply amount corresponding to the amount of adsorption of ammonia in the NOx catalyst 3 decreased from the target amount of adsorption is calculated in the period of time from the time of execution of the flow chart in the last operation period to the time of execution of the flow chart in the current operation period. The operation period supply amount is calculated by using the amount of ammonia consumption and the amount of desorption of ammonia. The relation between the amount of adsorption of ammonia decreased from the NOx catalyst 3, and the amount of supply of the reducing agent (the urea water) has been obtained in advance by experiments, simulations, or the like.

In step S105, the operation period supply amount calculated in step S104 at the time of the current execution of the flow chart is added to the operation period supply amount calculated in step S105 at the time of execution of the flow chart in the last operation period. That is, the operation period supply amount is integrated. Here, note that in this embodiment, the ECU 10 carries out the processing of step S105, and thus functions as a controller in the present disclosure.

In step S106, it is determined whether the period of time elapsed from the starting point in time of the last supply of the reducing agent is equal to or longer than the predetermined period of time. The predetermined period of time is a value which has been set in advance as the interval of supply of the reducing agent. The elapsed period of time from the starting point in time of the last supply of the reducing agent is counted by the ECU 10. In this step S106, it is determined whether it is the time to supply the reducing agent. In cases where an affirmative determination is made in step S106, the flow or routine of the flow chart in FIG. 3 goes to step S107, whereas in cases where a negative determination is made, this routine is ended.

In step S107, the reducing agent is supplied from the addition valve 42. The ECU 10 sets the integrated value of the operation period supply amount calculated in step S105 as the command supply amount, and causes the addition valve 42 to open only for the period of time corresponding to this command supply amount. The relation between the command supply amount and the valve opening time of the addition valve 42 has been obtained in advance by experiments, simulations or the like, and stored in the ECU 10. In addition, the counting of a new elapsed period of time begins from the starting point in time of the supply of the reducing agent, for the next supply of the reducing agent. When the processing of step S107 ends, the routine goes to step S108, where the integrated value of the operation period supply amount is reset. However, the command supply amount is stored in the ECU 10.

In this manner, the command supply amount at the point in time of the supply of the reducing agent can be calculated by first calculating the operation period supply amount until the predetermined period of time elapses, and then integrating this operation period supply amount. Then, according to this command supply amount, the reducing agent is supplied in each predetermined period of time.

Further, the ECU 10 carries out an abnormality diagnosis of the reducing agent supply device 4 by making a comparison between the command supply amount and the estimated value of the amount of supply of the reducing agent (hereinafter, referred to as the estimated amount of supply). For this purpose, the ECU 10 obtains the estimated amount of supply based on an integrated value of an amount of change of the rotational speed of the pump 44. Here, the ECU 10 carries out the feedback control of the rotational speed of the pump 44 so that the pressure in the reducing agent passage 43 comes close to the predetermined pressure. The predetermined pressure is a pressure of the reducing agent suitable for supplying the reducing agent from the addition valve 42. When the reducing agent is supplied from the addition valve 42, the pressure in the reducing agent passage 43 will drop. In cases where a pressure drop in the reducing agent passage 43 is detected by the pressure sensor 45, the pressure in the reducing agent passage 43 is quickly raised by increasing the rotational speed of the pump 44. Here, the amount of reducing agent actually supplied from the addition valve 42 is in correlation with the amount of pressure drop in the reducing agent passage 43. That is, the more the actual amount of supply of the reducing agent, the larger becomes the amount of pressure drop in the reducing agent passage 43, and hence, if such a relation has been obtained in advance by experiments, simulations, or the like, the estimated amount of supply can be obtained based on the amount of pressure drop in the reducing agent passage 43.

In addition, the rotational speed of the pump 44 is controlled in a feedback manner based on the pressure in the reducing agent passage 43, so the amount of pressure drop in the reducing agent passage 43 and the amount of rise in the rotational speed of the pump 44 are correlated with each other. That is, the more the amount of supply of the reducing agent from the addition valve 42, the larger becomes the amount of pressure drop in the reducing agent passage 43, and so, the larger the rotational speed of the pump 44 is made. Accordingly, the estimated amount of supply can also be obtained based on the amount of change of the rotational speed of the pump 44 which is in correlation with the pressure of the reducing agent. For this reason, in this embodiment, the estimated amount of supply is obtained based on the amount of change of the rotational speed of the pump 44 due to the delivery of the reducing agent. For the purpose of obtaining the estimated amount of supply, the ECU 10 is provided with a rotational speed counter for integrating the amount of change of the rotational speed of the pump 44. It can be said that the amount of change of the rotational speed of the pump 44 is a physical quantity correlated with the pressure of the reducing agent detected by the pressure sensor 45.

FIG. 4 is a time chart showing the change over time of the rotational speed of the pump 42 when the reducing agent is supplied from the addition valve 42. Even when the reducing agent is not supplied from the addition valve 42, the pump 44 rotates at a reference rotational speed (i.e., refer to a broken line in FIG. 4.) and delivers the reducing agent, in order to make the reducing agent to a predetermined pressure. When the reducing agent is supplied from the addition valve 42, the pressure in the reducing agent passage 43 drops, and hence, the ECU 10 raises the rotational speed of the pump 44 so as to compensate for this pressure drop. Then, the ECU 10 integrates the amount of change of the rotational speed of the pump 44 at this time by the use of the rotational speed counter. A count value of the rotational speed counter corresponding to one supply of the reducing agent is equal to an area of a range which is surrounded by a solid line and the reference rotational speed in FIG. 4. Here, note that among the reducing agent delivered from the pump 44 at the reference rotational speed, a part of the reducing agent exceeding the predetermined pressure passes through the check valve 48, and flows through the return passage 47, so that it is returned to the tank 41.

FIG. 5 is a view showing the relation between the rotational speed counter and the estimated amount of supply. As shown in FIG. 5, the larger the count value of the rotational speed counter, the larger becomes the estimated amount of supply. Thus, the count value of the rotational speed counter and the estimated amount of supply are correlated with each other, and so, if such a relation has been obtained in advance by experiments, simulations, or the like, the estimated amount of supply can be obtained based on the count value of the rotational speed counter.

Then, in principle, the ECU 10 carries out the abnormality diagnosis of the reducing agent supply device 4 by making a comparison between the command supply amount and the estimated amount of supply, which have been obtained as mentioned above. The abnormality in this case refers to an abnormality in which the actual amount of supply of the reducing agent becomes smaller than the command supply amount due to clogging of the addition valve 42, etc. When the reducing agent supply device 4 has an abnormality, the estimated amount of supply will become smaller than the command supply amount. For this reason, in cases where a diagnosis condition for carrying out an abnormality diagnosis is satisfied and the difference between the command supply amount and the estimated amount of supply is equal to or more than the predetermined amount, or in cases where the ratio of the estimated amount of supply with respect to the command supply amount is equal to or less than a predetermined ratio, a diagnosis can be made that the supply device has an abnormality. This predetermined amount or predetermined ratio has been obtained in advance by experiments, simulations, or the like as a value at the time when the reducing agent supply device 4 has an abnormality. The diagnosis condition will be described later in detail.

However, in cases where the command supply amount is small, the influence of variation in the rotational speed of the pump 44, etc., becomes relatively large at the time of obtaining the estimated amount of supply, so that an error becomes easy to occur in the estimated amount of supply. For this reason, it can become difficult to diagnose the abnormality of the reducing agent supply device 4 in an accurate manner. Accordingly, in this embodiment, the abnormality diagnosis of the reducing agent supply device 4 is carried out by using the estimated amount of supply at the time when the command supply amount is larger than a command supply amount threshold value. Moreover, it can be thought that with one time supply of the reducing agent, the estimated amount of supply may be affected by the influence of the variation in the rotational speed of the pump 44, etc., and hence, the supply of the reducing agent is carried out in a plurality of times, and abnormality diagnosis is carried out by comparing a total amount (integrated value)

of the command supply amount and a total amount of the estimated amount of supply at the time when the command supply amount is larger than the command supply amount threshold value. In this manner, the command supply amount threshold value is set as a condition for integrating the command supply amount and the estimated amount of supply. This command supply amount threshold value can also be said to be a command value of the amount of supply of the reducing agent at the time of supplying the reducing agent at which the accuracy of abnormality diagnosis falls within a suitable range or an allowable range. Accordingly, in cases where the command supply amount is equal to or less than the command supply amount threshold value, the ECU 10 does not carry out the integration of the command supply amount and the integration of the estimated amount of supply. Thus, the accuracy of the abnormality diagnosis can be enhanced by carrying out the abnormality diagnosis using the command supply amount and the estimated amount of supply at the time when the command supply amount is larger than the command supply amount threshold value. In addition, the influence of the variation in the rotational speed of the pump 44 can also be made small by carrying out abnormality diagnosis using the integrated value of the command supply amount and the integrated value of the estimated amount of supply at the time of supplying the reducing agent in a plurality of times, so that the accuracy of the abnormality diagnosis can be enhanced. On the other hand, the command supply amount threshold value is also used at the time of determining whether an abnormality diagnosis is carried out, as referred to below.

Here, FIG. 6 is a view showing the relation between the command supply amount and a cycle counter at the time of supplying the reducing agent. The cycle counter indicates a count value which is a determination value for determining whether the diagnosis condition, which is a condition for diagnosing an abnormality in the supply of the reducing agent, is satisfied, wherein the determination value is set in order to enhance the accuracy of the abnormality diagnosis. The count value of the cycle counter is 0 when the command supply amount per one time from the addition valve 42 is equal to or less than the command supply amount threshold value, and becomes larger in proportion to the command supply amount when the command supply amount becomes larger than the command supply amount threshold value. That is, the count value of the cycle counter can be called a value which is correlated with the command value. Here, note that the cycle counter shown in FIG. 6 is an example, but is not limited to this. For example, the count value of the cycle counter in the case where the command supply amount is larger than the command supply amount threshold value may be a value which is larger than 0, and which is also set as a fixed value irrespective of the command supply amount. Here, the reason why the count value of the cycle counter in the case where the command supply amount per one time from the addition valve 42 is equal to or less than the command supply amount threshold value is set to 0 is as follows: in cases where the command supply amount is small, the influence of variation in the rotational speed of the pump 44, etc., becomes large at the time of obtaining the estimated amount of supply, thus giving rise to the fear that the accuracy of the abnormality diagnosis may decrease, and hence, the command supply amount and the estimated amount of supply at this time are ignored. That is, by making a comparison between the command supply amount and the estimated amount of supply at the time when the command supply amount per one time is larger than the command supply amount threshold value, the influence of errors, etc., can be made small, so the accuracy of the abnormality diagnosis can be enhanced.

Then, in cases where the integrated value of the count value of the cycle counter exceeds a cycle counter threshold value which is a threshold value for the integrated value of the count value of the cycle counter, the abnormality diagnosis of the reducing agent supply device 4 is carried out. That is, in cases where the integrated value of the count value of the cycle counter exceeds the cycle counter threshold value, the ECU 10 determines that the diagnosis condition has been satisfied. The cycle counter threshold value has been obtained in advance by experiments, simulations or the like, as a count value of the cycle counter at which the accuracy of the abnormality diagnosis falls within the suitable range or the allowable range. That is, in cases where the integrated value of the count value of the cycle counter exceeds the cycle counter threshold value, it is meant that the supply of the reducing agent, in which the command supply amount is larger than the command supply amount threshold value, has been carried out to such an extent that a highly accurate abnormality diagnosis can be made, and in this case, it becomes possible to carry out the abnormality diagnosis with high accuracy. Here, note that it is not indispensable to require the supply of the reducing agent in a plurality of times, by the time the abnormality diagnosis is carried out. That is, when the command supply amount is large to some extent, the influence of the variation in the rotational speed of the pump 44 is small, and hence, when the correlation between the count value of the cycle counter and the command supply amount, and the cycle counter threshold value are set so that the count value of the cycle counter at that time becomes larger than the cycle counter threshold value, the diagnosis condition is satisfied even by the supply of the reducing agent in one time. Here, note that in this embodiment, the count value of the cycle counter corresponds to a determination value in the present disclosure. Also, in this embodiment, the cycle counter threshold value corresponds to an integration threshold value in the present disclosure.

Here, FIG. 7 is a time chart showing the change over time of the rotational speed of the pump 44 in cases where the command supply amount is relatively small. In addition, FIG. 8 is a time chart showing the change over time of the rotational speed of the pump 44 in cases where the command supply amount is relatively large. In each of FIG. 7 and FIG. 8, a solid line indicates a case where the reducing agent supply device 4 is normal, and a broken line indicates a case where the reducing agent supply device 4 is abnormal. A "valve opening period" shown in each of FIG. 7 and FIG. 8 is a period of time in which the addition valve 42 is being opened, and is also a period of time in which the reducing agent is being supplied. In each of FIG. 7 and FIG. 8, the valve opening period of time of the addition valve 42 is proportional to the command supply amount, and is decided according to the command supply amount. The amount of delivery and the discharge pressure of the reducing agent at the time when the pump 44 makes one revolution are the same in FIG. 7 and in FIG. 8. As shown in FIG. 7, in cases where the command supply amount is relatively small, the difference in the amount of change of the rotational speed of the pump 44 is relatively small between the case where the reducing agent supply device 4 is normal, and the case where the reducing agent supply device 4 is abnormal. That is, the difference in the count value of the rotational speed counter is relatively small between the case where the reducing agent supply device 4 is normal, and the case where the reducing agent supply device 4 is abnormal (i.e., an area surrounded by a solid line and a broken line is small). On the other hand, as shown in FIG. 8, in cases where the command supply amount is relatively large, the difference in the amount of change of the rotational speed of the pump 44 is relatively large between the case where the reducing agent supply device 4 is normal, and the case where the reducing agent supply device 4 is abnormal. That is, the difference in the count value of the rotational speed counter is relatively large between the case where the reducing agent supply device 4 is normal, and the case where the reducing agent supply device 4 is abnormal (i.e., an area surrounded by a solid line and a broken line is large).

Accordingly, by making a comparison between the integrated value of the command supply amount and the integrated value of the estimated amount of supply in the case where the command supply amount is larger than the command supply amount threshold value, the difference in the count value of the rotational speed counter can be made large between the case where the reducing agent supply device 4 is normal, and in the case where the reducing agent supply device 4 is abnormal, as a result of which it is possible to enhance the accuracy of the abnormality diagnosis of the reducing agent supply device 4.

However, depending on the operating state of the internal combustion engine 1, the amount of NOx discharge from the internal combustion engine 1 may be small, for example, and in this case, the command supply amount becomes smaller than the command supply amount threshold value. In cases where such an operating state continues, the count value of the cycle counter does not increase, so the diagnosis condition for the abnormality diagnosis of the reducing agent supply device 4 is not satisfied, thus making it difficult to carry out the abnormality diagnosis.

Accordingly, in this embodiment, in cases where the period of time in which the diagnosis condition is not satisfied is integrated and the thus integrated period of time becomes larger than a time period threshold value, the interval of supply of the reducing agent is made longer than the normal predetermined period of time so that the count value of the cycle counter can become easy to be increased. The predetermined period of time after made longer in this manner is set as an extended predetermined period of time.

In this manner, by extending the interval of supply of the reducing agent, an integrated value of the amount of ammonia consumption and an integrated value of the amount of surplus ammonia become larger, so the command supply amount per one time is increased. Then, the increase of the command supply amount makes it easy to increase the count value of the cycle counter. Accordingly, a period of time until the abnormality diagnosis of the reducing agent supply device 4 is carried out can be shortened, so an opportunity to carry out the abnormality diagnosis can be increased.

FIG. 9 is a flow chart showing a flow or routine for the abnormality diagnosis of the reducing agent supply device 4 according to this first embodiment. This flow chart is carried out by means of the ECU 10 after the supply of the reducing agent from the addition valve 42. That is, this flow chart is carried out by the ECU 10 after the end of step S107 in the flow chart shown in FIG. 3.

In step S201, it is determined whether the command supply amount is larger than the command supply amount threshold value. The command supply amount referred to herein is the command supply amount at the time of supplying the reducing agent in step S107 of FIG. 3, and has been stored by the ECU 10. The command supply amount threshold value is the value explained in FIG. 6, and has been stored in the ECU 10. In this step S201, it is determined whether an amount of increase in the count value of the cycle counter becomes larger than 0. In cases where the command supply amount is equal to or less than the command supply amount threshold value, there is a fear that the accuracy of the abnormality diagnosis may be decreased due to a variation in the rotational speed of the pump 44, etc., and so, the data of the abnormality diagnosis obtained at this time are not used. Moreover, at this time, the abnormality diagnosis is not carried out. In cases where an affirmative determination is made in step S201, the routine advances to step S202, whereas in cases where a negative determination is made, the routine advances to step S211.

In step S202, the estimated amount of supply is calculated based on the count value of the rotational speed counter. The ECU 10 calculates the count value of the rotational speed counter by integrating the amount of change of the rotational speed of the pump 44 at each supply of the reducing agent. The ECU 10 has stored this count value of the rotational speed counter. Then, if the relation shown in FIG. 5 has been obtained in advance by experiments, simulations or the like, and stored in the ECU 10, the estimated amount of supply can be obtained from the count value of the rotational speed counter. Here, note that in this embodiment, the ECU 10 carries out the processing of step S202, and thus functions as a controller in the present disclosure.

In step S203, the command supply amount is integrated. The ECU 10 integrates the command supply amount by adding a command supply amount calculated at the time of the current supply of the reducing agent to an integrated value of a command supply amount calculated at the time of processing of step S203 in the last operation period.

In step S204, the count value of the cycle counter is integrated. The ECU 10 integrates the count value of the cycle counter by adding a count value of the cycle counter calculated at the time of the current supply of the reducing agent to an integrated value of a count value of the cycle counter calculated at the time of processing of step S204 in the last operation period. The count value of the cycle counter calculated at the time of the current supply of the reducing agent is a count value of the cycle counter obtained from the relation shown in FIG. 6 based on the command supply amount calculated at the time of the current supply of the reducing agent.

In step S205, the estimated amount of supply is integrated. The ECU 10 integrates the estimated amount of supply by adding an estimated amount of supply calculated at the time of processing of the current step S202 to an integrated value of an estimated amount of supply calculated at the time of processing of step S205 in the last operation period.

In step S206, it is determined whether the count value of the cycle counter is larger than the cycle counter threshold value. In this step S206, it is determined whether the condition for carrying out the abnormality diagnosis of the reducing agent supply device 4 is satisfied. That is, in this step S206, it is determined whether the accuracy of the abnormality diagnosis of the reducing agent supply device 4 is within the suitable range or the allowable range. Accordingly, the cycle counter threshold value has been obtained in advance by experiments, simulations or the like, as a count value of the cycle counter at which the accuracy of the abnormality diagnosis of the reducing agent supply device 4 falls within the suitable range or the allowable range, and stored in the ECU 10. In cases where an affirmative determination is made in step S206, the routine advances to step S207, whereas in cases where a negative determination is made, the routine advances to step S211.

In step S207, it is determined whether a value, which is obtained by dividing the integrated value of the estimated amount of supply calculated in step S205 by the integrated value of the command supply amount calculated in step S203, is larger than a diagnosis threshold value. The diagnosis threshold value is a value which is equal to or larger than zero and which is equal to or less than 1, and has been obtained in advance by experiments, simulations or the like, as a ratio of the integrated value of the estimated amount of supply with respect to the integrated value of the command supply amount in the case of the reducing agent supply device 4 being abnormal. The diagnosis threshold value thus obtained has been stored in the ECU 10. In this step S207, it is determined whether the reducing agent supply device 4 is normal. In cases where an affirmative determination is made in step S207, the routine advances to step S208, where a determination is made that the reducing agent supply device 4 is normal. On the other hand, in cases where a negative determination is made in step S207, the routine advances to step S209, where a determination is made that the reducing agent supply device 4 is abnormal.

After the processing of step S208 or step S209 is completed, the routine goes to step S210, where the count value of the cycle counter integrated in step S204, the count value of the rotational speed counter integrated in step S202, the command supply amount integrated in step S203, the estimated amount of supply integrated in step S205, and the integrated period of time calculated by the ECU 10 are all reset, and the interval of supply of the reducing agent is set to the normal predetermined period of time. When the processing of step S210 is completed, this routine is ended.

On the other hand, in step S211 after a negative determination is made in step S206, it is determined whether an integrated period of time elapsed after carrying out the last abnormality diagnosis of the reducing agent supply device 4 is larger than the time period threshold value. The integrated period of time is calculated by the ECU 10 as needed. The time period threshold value is set so as to satisfy the frequency of the abnormality diagnosis as required, and has been stored in the ECU 10. That is, when the state where the integrated value of the count value of the cycle counter is equal to or less than the cycle counter threshold value continues long, a period of time in which the abnormality diagnosis of the reducing agent supply device 4 can not be carried out becomes long, an opportunity to carry out the abnormality diagnosis decreases. In this case, the interval of supply of the reducing agent from the addition valve 42 is extended so that the opportunity for the abnormality diagnosis can be increased. Here, note that in this step S211, a determination may be made based on the distance of travel, instead of the integrated period of time. That is, it may be determined whether the distance of travel of the vehicle after carrying out the last abnormality diagnosis of the reducing agent supply device 4 is equal to or more than a predetermined distance. The predetermined distance is set so as to satisfy the frequency of the abnormality diagnosis as required. In cases where an affirmative determination is made in step S211, the routine goes to step S212, whereas in cases where a negative determination is made, the routine goes to step S213, where the interval of supply of the reducing agent is set to the normal predetermined period of time.

In step S212, the interval of supply of the reducing agent is extended. That is, the interval of supply of the reducing agent is made longer than the normal predetermined period of time, and it is set as the extended predetermined period of time. In this case, the predetermined period of time is changed so that the predetermined period of time in step S106 of the flow chart shown in FIG. 3 becomes the extended predetermined period of time. Here, by making the predetermined period of time long, a period of time until an affirmative determination is made in step S106 becomes long. That is, the interval in which the reducing agent is supplied in step S107 becomes long. Accordingly, the command supply amount at the time of supplying the reducing agent also increases, so the count value of the cycle counter becomes easy to go up. As a result, it is possible to increase the opportunity for the abnormality diagnosis of the reducing agent supply device 4. For the extended predetermined period of time, an optimum value has been obtained by experiments, simulations or the like as a value at which the count value of the cycle counter can go up, and the optimum value thus obtained has been stored in the ECU 10. Here, note that in cases where the processing of step S212 is again carried out after the interval of supply of the reducing agent was once extended in step S212, the interval of supply of the reducing agent may be maintained as it has already been extended, or the interval of supply of the reducing agent may be extended further. However, if the interval of supply of the reducing agent is extended too much, the NOx reduction rate may become low, and hence, it is preferable to set an upper limit for the period of time to be extended. When the processing of step S212 or S213 is completed, this routine is ended. Here, note that in this embodiment, the ECU 10 carrying out the processings of steps S201, S206, S207, S211 and S212 functions as a controller in the present disclosure.

As described above, according to this embodiment, the command supply amount per one time at the time of supplying the reducing agent is increased by extending the interval of supply of the reducing agent, and so, the count value of the cycle counter becomes easy to increase. With this, the integrated value of the count value of the cycle counter becomes larger than the cycle counter threshold value at an early stage. Accordingly, the diagnosis condition at the time of carrying out the abnormality diagnosis of the reducing agent supply device 4 comes to be satisfied more quickly, so that the frequency of carrying out the abnormality diagnosis can be enhanced. That is, according to this embodiment, it is possible to increase the opportunity to carry out the abnormality diagnosis of the reducing agent supply device 4. In addition, the abnormality diagnosis of the reducing agent supply device 4 is carried out by using the data at the time of the command supply amount being in a relatively large state, so that the accuracy of the abnormality diagnosis can be enhanced.

(Modification)

Reference will be made to a modification of the first embodiment. As mentioned above, the extended predetermined period of time may be a fixed value which has been obtained in advance through experiments, simulations or the like, but in this modification, the extended predetermined period of time is made variable, and the supply of the reducing agent is not carried out until the command supply amount becomes larger than the command supply amount threshold value.

Here, in cases where the interval of supply of the reducing agent is extended, it is difficult to predict how the amount of incoming NOx changes after this in FIG. 2, and so, it is difficult to know in advance the period of time until the command supply amount at the time of supplying the reducing agent per one time becomes larger than the command supply amount threshold value. That is, in cases where the extended predetermined period of time is a fixed value, even if the interval of supply of the reducing agent is extended, the integrated value of the count value of the cycle counter is not necessarily increased. For example, although the amount of incoming NOx can also be obtained on the assumption that the operating state of the internal combustion engine 1 at the current point in time continues, this can not be said to be accurate because it is also considered that the operating state of the internal combustion engine 1 changes after that. For this reason, in this modification, it is decided to wait until the command supply amount becomes larger than the command supply amount threshold value, so that the count value of the cycle counter can be increased in a reliable manner. That is, the operation period supply amount, which is obtained from the amount of ammonia consumption and the amount of surplus ammonia, is integrated, and after the integrated value of this operation period supply amount, i.e., the command supply amount, becomes larger than the command supply amount threshold value, the reducing agent is supplied from the addition valve 42. In this case, a point in time, at which the command supply amount becomes larger than the command supply amount threshold value, becomes a point in time at which the extended predetermined period of time expires. In this manner, by extending the interval of supply of the reducing agent until the command supply amount becomes larger than the command supply amount threshold value, the count value of the cycle counter is increased in a reliable manner at the time of supplying the reducing agent. Accordingly, the count value of the cycle counter becomes larger than the cycle counter threshold value at an earlier stage, thus making it possible to increase the opportunity to carry out the abnormality diagnosis of the reducing agent supply device 4. Thus, in cases where the interval of supply of the reducing agent is extended until the command supply amount becomes larger than the command supply amount threshold value, when the step S212 in FIG. 9 is carried out, the following flow chart shown in FIG. 10 will be carried out, instead of the flow chart shown in FIG. 3.

FIG. 10 is the flow chart showing a flow or routine for reducing agent supply control in the case where the interval of supply of the reducing agent is extended. This flow chart is carried out by the ECU 10, instead of the flow chart shown in FIG. 3, after an affirmative determination is made in step S211. For example, a change flag for changing the reducing agent supply control from the control routine shown in FIG. 3 to the control routine shown in FIG. 10 may be set, wherein the change flag is turned to ON in step S212, and the control routine shown in FIG. 10 may be carried out in the subsequent reducing agent supply control. Here, note that the flow chart shown in FIG. 10 is different from the flow chart shown in FIG. 3 only in that the processing of step S301 is carried out instead of the processing of step S106 in FIG. 3, and hence, for the other steps in which the same processings are carried out, the same reference numerals and characters are attached and the explanation thereof is omitted.

In the flow chart or routine shown in FIG. 10, when the processing of step S105 is completed, the routine goes to step S301. In step S301, it is determined whether the integrated value of the operation period supply amount calculated in step S105 is larger than the command supply amount threshold value. Here, note that the command supply amount threshold value may be the same value as that in step S201, but when it is set to a larger value than that in step S201, the count value of the cycle counter can be made to increase more quickly. Then, in cases where an affirmative determination is made in step S301, the routine goes to step S107, whereas in cases where a negative determination is made, this routine is ended. By carrying out this step S301, the reducing agent is not supplied until the integrated value of the operation period supply amount becomes large than the command supply amount threshold value, so the count value of the cycle counter can be made to increase in a reliable manner. Accordingly, in step S206, an affirmative determination is made at an early stage, so that the abnormality diagnosis of the reducing agent supply device 4 can be carried out quickly. After the abnormality diagnosis is carried out, the interval of supply of the reducing agent is returned to the normal interval in step S210, and hence, the flow chart shown in FIG. 3 is carried out, in place of the flow chart shown in FIG. 10. By doing in this manner, in this modification, too, the ECU 10 carrying out the processings of steps S201, S206, S207, S211 and S212 functions as the controller in the present disclosure.

As described above, according to this modification, too, by extending the interval of supply of the reducing agent, it is possible to increase the opportunity to carry out the abnormality diagnosis of the reducing agent supply device 4. In addition, the abnormality diagnosis of the reducing agent supply device 4 is carried out by using the data at the time of the command supply amount being in a relatively large state, and hence, the accuracy of the abnormality diagnosis can be enhanced.

Second Embodiment

Here, when the temperature of the NOx catalyst 3 becomes high, it becomes difficult for ammonia to adsorb to the NOx catalyst 7, and the amount of adsorption of ammonia in the NOx catalyst 7 will decrease. When the interval of supply of the reducing agent is extended in such a state, ammonia may run short by the time of the following supply of the reducing agent. Accordingly, there is a fear that the NOx removal or reduction rate will decrease or become low. For this reason, in this second embodiment, in cases where the temperature of the NOx catalyst 3 is equal to or higher than a predetermined temperature (e.g., 350 degrees centigrade), the extension of the interval of supply is not carried out. As a result of this, a decrease in the NOx removal or reduction rate is suppressed. The other components and so on in this second embodiment are the same as those in the first embodiment, so the explanation thereof is omitted.

FIG. 11 is a flow chart showing a flow or routine for the abnormality diagnosis of the reducing agent supply device 4 according to this second embodiment. This flow chart is carried out by means of the ECU 10 after the supply of the reducing agent from the addition valve 42. That is, this flow chart is carried out by the ECU 10 after the end of step S107 in the flow chart shown in FIG. 3. Here, note that for those steps in which the same processings as in the flow shown in FIG. 9 are carried out, the same reference numerals and characters are attached and the explanation thereof is omitted.

In the flow chart shown in FIG. 11, in cases where an affirmative determination is made in step S211, the routine goes to step S401. In step S401, it is determined whether the catalyst temperature is less than the predetermined temperature. The predetermined temperature has been obtained by experiments, simulations or the like as a temperature at which the NOx reduction rate may become lower than an allowable range when the interval of supply of the reducing agent is extended, and has been stored in ECU 10. In cases where an affirmative determination is made in step S401, the routine goes to step S212, whereas in cases where a negative determination is made, the routine goes to step S213. Here, note that in this second embodiment, the ECU 10 carrying out the processings of steps S201, S206, S207, S211, S401 and S212 functions as the controller in the present disclosure.

As described above, according to this second embodiment, by extending the interval of supply of the reducing agent only in the case where there is no fear that the NOx reduction rate is decreased, it is possible to increase the opportunity to carry out the abnormality diagnosis of the reducing agent supply device 4, while suppressing the decrease in the NOx reduction rate. In addition, the abnormality diagnosis of the reducing agent supply device 4 is carried out by using the data at the time of the command supply amount being in a relatively large state, and hence, the accuracy of the abnormality diagnosis can be enhanced.

The invention claimed is:

1. An abnormality diagnosis device for an exhaust gas purification apparatus in an internal combustion engine, which is to diagnose an abnormality of said exhaust gas purification apparatus which is provided with:
   an NOx selective catalytic reduction catalyst that is arranged in an exhaust passage of the internal combustion engine and configured to reduce NOx by using a reducing agent;
   an addition valve configured to supply the reducing agent into said exhaust passage at the upstream side of said NOx selective catalytic reduction catalyst;
   a pump configured to deliver an amount of reducing agent to said addition valve according to a rotational speed thereof;
   a reducing agent passage that connects said pump and said addition valve with each other for flowing the reducing agent therethrough; and
   a pressure sensor configured to detect a pressure of the reducing agent;
   said abnormality diagnosis device comprising:
   a controller configured to:
   calculate a command value for an amount of supply of the reducing agent to be given to said addition valve at each interval of supply of the reducing agent, based on a total amount of an amount of NOx which flows into said NOx selective catalytic reduction catalyst at each interval of supply of the reducing agent;
   calculate an estimated value of the amount of supply of the reducing agent from said addition valve at each interval of supply of said reducing agent based on the pressure detected by said pressure sensor or a physical quantity correlated with said pressure; and
   make a determination that a diagnosis condition, which is a condition for diagnosing an abnormality in the supply of the reducing agent, is satisfied, when an integrated value of a determination value correlated with the command value of the amount of supply of the reducing agent calculated by said controller at the time when said command value is larger than a command supply amount threshold value reaches an integration threshold value, and diagnoses an abnormality in the supply of the reducing agent, based on an integrated value of the command value of the amount of supply of the reducing agent calculated by said controller at the time when said command value is larger than said command supply amount threshold value, and an integrated value of the estimated value of the amount of supply of the reducing agent calculated by said controller, at the same time as when the command value of the amount of supply of the reducing agent calculated by said controller is larger than said command supply amount threshold value, wherein said controller configured to extend the interval of supply of said reducing agent in the case where a period of time in which said diagnosis condition is not satisfied is longer than a time period threshold value, more than in the case where said diagnosis condition is satisfied, or in the case where the period of time in which said diagnosis condition is not satisfied is equal to or less than said time period threshold value.

2. The abnormality diagnosis device for an exhaust gas purification apparatus in an internal combustion engine as set forth in claim 1, wherein
   in cases where the period of time in which said diagnosis condition is not satisfied is longer than said time period threshold value,
   said controller extends the interval of supply of said reducing agent in the case where the temperature of said NOx selective catalytic reduction catalyst is less than a predetermined temperature, more than in the case where said diagnosis condition is satisfied, or in the case where the period of time in which said diagnosis condition is not satisfied is equal to or less than said time period threshold value, and
   said controller makes the interval of supply of said reducing agent in the case where the temperature of said NOx selective catalytic reduction catalyst is equal to or higher than said predetermined temperature, equal to that in the case where said diagnosis condition is satisfied, or in the case where the period of time in which said diagnosis condition is not satisfied is equal to or less than said time period threshold value.

* * * * *